United States Patent Office 3,523,801
Patented Aug. 11, 1970

3,523,801
PROCESS FOR THE PREPARATION
OF SEASONINGS
Akio Shiga and Kengo Ishida, Tokyo-to, Japan, assignors to Kyowa Hakko Kogyo Kabushiki Kaisha, Tokyo-to, Japan, a corporation of Japan
No Drawing. Filed Jan. 6, 1967, Ser. No. 607,658
Claims priority, application Japan, Jan. 13, 1966,
41/1,551, 41/1,552, 41/1,553, 41/1,554
Int. Cl. A23l 1/22
U.S. Cl. 99—140                           10 Claims

ABSTRACT OF THE DISCLOSURE

Process of preparing seasonings from microbial bodies obtained from fermentation liquors, or from fermentation liquors containing such microbial bodies, by combined enzymatic and chemical treatment of said microbial bodies or liquors containing same.

FIELD OF INVENTION

The present invention is concerned with a process for the preparation of seasonings having all-purpose enhancing and flavouring properties with a high yield from microbial bodies or from fermentation liquors containing microbial bodies which are obtained from fermented broths of various amino acids or nucleic acid-related substances after recovery of substantial amounts of the main product.

In these microbial bodies or fermentation liquors containing same are included various other substances capable of enhancing and flavouring foodstuffs, as well as valuable substances useful for nutritional purposes such as vitamins, organic salts and sugars. For example, we have observed that microbial bodies obtained from fermentation broths of amino acids or nucleic acid-related substances contain about 50–60 wt. percent of cell protein and vitamins exemplified in the following table.

Amounts of vitamins in cell bodies (dried) in p.p.m.:

| | |
|---|---|
| Thiamin | 10–15 |
| Nicotinic acid | 200–210 |
| Pyridoxine | 5–6 |
| Folic acid | 10–12 |
| Riboflavin | 50–55 |
| Pantothenic acid | 110–115 |
| Biotin | 1–4 |
| Inositol | 1000–1200 |

It is further observed that 5'-inosinic acid and 5'-guanylic acid amounting to 15–20 mg./g. and 10–15 mg./g. are contained respectively in cell bodies of corresponding acids-producing microorganisms.

DESCRIPTION OF PRIOR ART

It is well known to produce seasonings containing amino acids by the decomposition of amino acid-producing microbial bodies with concentrated hydrochloric acid. However, this process has the disadvantage that various other valuable compositions than amino acids are destroyed by the strong activity of the hydrochloric acid used.

It is also known to obtain seasonings, i.e. the so-called yeast extract from yeast by conventional extraction methods. But these products have also the disadvantage of the so-called yeast-like odour, which seems to injure their commercial value.

Seasonings having excellent enhancing or flavouring properties and containing various valuable nutrients could be prepared if ingredients of the microbial bodies could be recovered without injury to the enhancing or nutritive values thereof.

SUMMARY OF THE INVENTION

We have now made a discovery that seasonings containing almost all valuable compositions useful for enhancing or flavouring purposes as well as nutritive compositions, such as vitamins, can be prepared from these microbial bodies or fermentation liquors containing same, with a high yield, by combining enzymatic decomposition and chemical decomposition techniques. The products are confirmed by various tests, including sensory tests using taste panels, to be far superior to those obtained by conventional processes with regard to their enhancing or flavouring properties. The seasonings according to the present invention possess meat-like flavour and are suitable for all enhancing or flavouring purposes. Furthermore, the process according to the present invention can be carried out with a high yield substantially without any destruction of valuable compositions contained in these materials.

An object of the present invention, is therefore, to provide a process for the preparation of seasonings from microbial bodies, or from fermentation liquors containing same, which are obtained from fermented broths of amino acids or nucleic acid-related substances after recovery of substantial amounts of the main products.

Another object of the present invention is to provide a process for the preparation of seasonings having excellent enhancing and flavouring properties and suitable for all enhancing purposes, with a high yield.

Seasonings obtained by the process of the present invention contain amino acids and other various compositions useful for enhancing or flavouring purposes as well as nutrients such as vitamins and sugars, and can be prepared with a high yield. Furthermore, the products obtained by the process of the present invention have far superior enhancing or flavouring properties as compared to those obtained by conventional processes.

DETAILED DESCRIPTION OF THE INVENTION

According to the present invention, we provide a process of preparing seasonings from microbial bodies or from fermentation liquors containing microbial bodies resulting from the preparation of amino acids or nucleic acid-related substances, with a high yield, characterized by adding an alkaline salt or alkali to the microbial bodies to give a concentration of about 0.02–0.1 N, heating said solution at about 50–80° C. for about 1–3 hours, adjusting the pH of the solution to about 6.0–8.0, adding to the solution an enzyme in an amount of about 0.5–2.0 wt. percent of the protein contained in the substrate, decomposing enzymatically the ingredients of the solution for about 6–48 hours at about 50–60° C., removing colouring matters or bitterness from the decomposed solution, and separating the decomposed fraction from the undecomposed fraction, thereby to obtain a seasoning from the decomposed fraction.

Microbial bodies obtained from fermented broths of amino acids or from the fermentation of nucleic acid-related substances are protected by hard protective cell walls and membranes, which are liable to give various troubles if treated with protease in a conventional manner. We have found that protease of ordinary market grade can with advantage decompose cell bodies which are treated previously with a weak salt or alkaline solution having a concentration of 0.1–0.02 N for about 1–3 hours for 50–80° C. without any substantial decomposition of the desired flavouring ingredients. Preferable salts or alkaline substances for the pretreatment include, for example, sodium carbonate, sodium bicarbonate, caustic soda, potassium hydroxide, etc., while other various weak salts or alkalies may be used for this purpose.

After adjusting the pH of the solution to 6.0–8.0 by adding a suitable water-containing substance, the solution is preferably heated at 80–130° C. for a short period of time such as e.g. 3–10 minutes. A protease in an amount of 0.5–2.0 wt. percent (by total protein contained in the substrate) is then added to the solution. It is possible to use a suitable preparation of protease of commercial grade or protease-containing solution cultured separately for this purpose. The enzymatic decomposition is carried out under suitable conditions, e.g. at a temperature of 50–55° C. and for 6–48 hours, thereby to decompose cell proteins into amino acids and peptides with a yield of about 50–70%. Decomposition of substances having enhancing properties or nutrients is hardly observed by the enzymatic treatment. A suitable antiseptic agent such as ethyl alcohol, toluol, or ethyl acetate may be, if desired, added.

By the enzymatic treatment, cell proteins are converted into amino acids and lower peptides with a large yield, and all soluble parts are eluted in the solution. The solution is then adjusted to a pH of 4.5–5.5 and afterward filtered to obtain a filtrate. The filtrate is treated by a suitable method for the removal of bitter taste and colouring matters such as by passing through a decolourizing resin, e.g. Duolite #S–30 (the trade name of a commercially available resin), in its Cl form or by absorbing with active charcoal, and is then adjusted to a suitable pH such as 5.0–6.0, from which the major portion of the seasoning product according to the present invention can be obtained by concentrating under reduced pressure. This product may be in liquid, powder or paste forms and contains various enhancing or flavouring compositions and amino acids, as well as vitamins and sugars. By the treatment using protease, the product obtained contains various valuable substances and possesses excellent enhancing or flavouring properties with meat-like flavour where little or no loss of enhancing substances and nutrients can be observed except a slight loss of riboflavin.

The undecomposed fraction separated by the filtration, however, still contains about 30–50% of total cell proteins. Cell proteins contain all types of the essential amino acids, and we have observed that lower peptides have a unique activity for enhancing foodstuffs.

According to another feature of the present invention, the undecomposed fraction (which contains about 60–80% water) is mixed with hydrochloric acid (as 35% HCl) in an amount of 3–5 times by weight of total proteins and decomposed at about 100–115° C. for about 10–20 hours to give a ratio of total nitrogen to amino-nitrogen (hereinafter designated as APL) of about 1.6–3.5. The following Table 2 shows that under these decomposition conditions large amounts of peptides can be formed from the undecomposed fraction. The figures in this table are obtained from various tests using 10 kg. of microbial bodies obtained from a conventional amino acids fermentation using *Micrococcus glutamicus* ATCC 13761, while similar results are obtained from other tests using other cell bodies.

TABLE 2

Relationship between water content (A) and total proteins (B) contained in cell bodies, amounts of hydrochloric acid (35% HCl) (C), reaction temperatures (D), reaction times (E) and APL values obtained (F):

| A (percent) | B (kg.) | C (kg.) | D (° C) | E (H.) | F |
| --- | --- | --- | --- | --- | --- |
| 62 | 1.9 | 3.8 | 115 | 25 | 12.2 |
| 62 | 1.9 | 4.75 | 115 | 24 | 8.2 |
| 62 | 1.9 | 5.7 | 115 | 15 | 3.4 |
| 62 | 1.9 | 7.6 | 105 | 13 | 3.0 |
| 62 | 1.9 | 7.6 | 115 | 15 | 2.6 |
| 62 | 1.9 | 9.5 | 100 | 15 | 2.1 |
| 62 | 1.9 | 11.4 | 103 | 12 | 1.2 |
| 73 | 1.4 | 2.8 | 120 | 25 | 11.2 |
| 73 | 1.4 | 3.5 | 115 | 24 | 6.5 |
| 73 | 1.4 | 4.2 | 115 | 15 | 3.5 |
| 73 | 1.4 | 4.2 | 115 | 10 | 3.7 |
| 73 | 1.4 | 5.6 | 103 | 13 | 3.2 |
| 73 | 1.4 | 5.6 | 115 | 10 | 2.8 |
| 73 | 1.4 | 7.0 | 100 | 15 | 2.1 |
| 73 | 1.4 | 7.0 | 115 | 15 | 1.8 |
| 73 | 1.4 | 8.4 | 103 | 10 | 1.4 |

Table 2 shows that hydrochloric acid (as 35% HCl) amounts of below about 2.5 times (by weight of total cell proteins) may give more than 6.5 of APL values, and hydrochloric acid amounts of above about 6 times may also give APL values indicating production of substantially only free amino acids.

The decomposed solution having an APL value of 1.6–3.5 is filtered, after preferably adding water, to give a filtrate. The filtrate is concentrated under reduced pressure, and is neutralized by adding a suitable neutralizing agent such as e.g. sodium carbonate, sodium hydroxide, etc. to give a pH of 4–6. The solution is purified by a suitable method such as by adsorbing with active charcoal or by passing through a decolourizing resin and is then adjusted to a suitable pH such as 4.0–6.0, from which a decomposed product in liquid, paste or powder forms can be obtained by conventional concentration techniques. This product is preferably added to the main product according to the method as defined above.

Microbial bodies which may be useful for the process according to the present invention include those obtained from fermented broths of amino acids fermentation such a glutamic acid, lysine, valine, leucine, isoleucine, ornithing, threonine, and those obtained from fermented broths of various nucleic acid related substanced such as fermented broths of 5′-inosinic acid, 5′-guanylic acid, orotic acid, guanine, etc.

Various features obtainable by the process according to the present invention can be exemplified as follows:

(1) It is possible to obtain improved seasoning agents by the exhaustive treatment of microbial bodies according to the present invention; whereby the seasoning agents obtained have well balanced amino acids components and harmonious enhancing properties. Moreover, seasoning agents having excellent enhancing properties and containing 5′-nucleotides besides amino acids can be obtained by using microbial bodies of 5′-nucleotides fermented broths.

(2) Seasonings according to the present invention contain large amounts of essential amino acids and various other nutrients such as e.g. vitamins, nucleotides, nucleosides, peptides, etc. thereby providing seasonings having high nutritive values with a high yield.

The present invention is directed to the exhaustive treatment of various useful ingredients contained in microbial bodies and the provision of seasonings having excellent enhancing and flavouring properties.

The following non-limitative examples illustrate the invention.

Example 1

A fermented broth in an amount of 100 litres, obtained by culturing *Micrococcus glutamicus* ATCC 13761 in conventional manner, was adjusted to a pH of 4.5 and was centrifuged to give 5.5 kg. of microbial bodies (water content—73.5%), which were added to 35 litres of 0.05 N aqueous solution of sodium carbonate to form a cell milk. The cell milk was heated at 55° C. for two hours with stirring for destroying cell walls and membranes. After this, the solution was adjusted to a pH of 7.2 by adding 2 N aqueous solution of hydrochloric acid and was heated at 105° C. for 10 minutes. After cooling to 55° C., the solution was added to 7.5 grams of Pronase (the trade name of a protease preparation available from Kaken Kagaku Kogyo K.K., Tokyo, Japan), i.e. in an amount of 1% by total protein, and was hydrolyzed at 50–55° C. for 16 hours. The hydrolyzed solution contained 2.7 g./l. of total nitrogen and 2.2 g./l. of glutamic acid. In this solution, 82% of cell protein was decomposed to form amino acids and peptides. As the decomposed solution contained a bitter taste, the following procedures were carried out for the removal of bitter taste and colouring matters. The solution was adjusted to a pH of 4.8 by adding 2 N HCl aqueous solution and was filtered to obtain a filtrate and undecomposed part. The undecomposed part was washed with 2 litres of water. The filtrate and washings were combined to give 36.5 litres of clear combined decomposed solutions, which were then passed through a resin column packed with 1.8 litres of a decolourizing resin, Duolite #S–30 (the trade name of a commercially available resin) in its Cl form in a volume of 1/20 to that of the solution to be decomposed, at a flow rate of Space Velocity of 2.0. The elution was completed after about 10 minutes. The resin was washed with water in an amount of 4 litres. The eluate and washings were combined to give 40 litres of combined solutions having no bitter taste. After adjusting the pH to 5.5 by the addition of 2 N caustic soda solution, the solution was concentrated under reduced pressure at 50–60° C. to give 780 grams of a pastry seasoning agent, which had comprehensive enhancing properties and the following compositions.

TABLE 3.—ANALYTICAL RESULTS OF THE PASTRY SEASONING AGENT

| | |
|---|---|
| Water _____percent__ | 12.5 |
| NaCl _____do____ | 15.5 |
| Total nitrogen _____do____ | 10.5 |
| Amino acids (percent): [1] | |
| Alanine _____ | 3.0 |
| Lysine _____ | 0.8 |
| Leucine _____ | 0.8 |
| Glutamic acid _____ | 12.5 |
| Aspartic acid _____ | 1.3 |
| Valine _____ | 0.8 |
| Vitamins ($\gamma$/g.): [1] | |
| Thiamine _____ | 2.1 |
| Pantothenic acid _____ | 2.5 |
| Pyridoxine _____ | 0.8 |
| Folic acid _____ | 0.9 |
| Riboflavin _____ | 15.5 |
| Nicotinic acid _____ | 25.6 |
| Inositol _____ | 350 | pH of 2% aqueous solution, 5.5.

Other amino acids were also detected.

[1] $\gamma$/g. in the above table and throughout the specification is 1/1,000,000 g., i.e., $10^{-6}$ gram.

Example 2

A 5'-inosinic acid fermented broth in an amount of 100 litres, obtained by culturing *Microbacterium ammoniagenes*, KY 3454 (ATCC 6872) in conventional manner, was adjusted to a pH of 4.5 and gave 8.4 kg. of cell bodies (water content—70.2%) by the centrifugation, which were then added to 52 litres of 0.03 N caustic soda aqueous solution to form a cell millk.

The cell milk was heated at 60° C. with stirring for one hour to dissolve cell walls and membranes, 2 N HCl aqueous solution was then added to adjust the pH to 7.0, following which the solution was heated at 105° C. for 10 minutes. After cooling to 50° C., the solution was mixed with 12.5 grams (i.e. 1% by protein substrate) of *Streptomyces protease*, Prozyme (the trade name of the protease available from Kyowa Hakko Kogyo K.K., Tokyo, Japan) to decompose cell protein at 50–53° C. After 8 hours from starting the decomposition, an additional amount of 12.5 grams of the same protease was added to the solution and hydrolysis was carried out additionally for 8 hours (total 16 hours). 80–82% of cell protein was converted into amino acids and lower peptides by the enzymatic treatment. After the completion of the decomposition, the solution was heated at 105° C. for 5 minutes to discontinue the reaction and was then cooled. The solution was adjusted to a pH of 4.6 by the addition of 2 N HCl aqueous solution and was filtered. There was obtained 50 litres of the filtrate separated from undecomposed materials. The latter was washed with 3 litres of water. The filtrate and washings were combined and were passed through a resin column packed with 2.5 litres of Duolite #S–30 (a decolourizing resin) in its Cl form at a flow rate of Space Velocity of 2. The elution was completed after 10 hours. The column was then washed with water in an amount of 5 litres. A combined eluate in an amount of 55 litres was obtained. The eluate was adjusted to a pH of 5.5 by adding 2 N caustic soda aqueous solution and was concentrated under reduced pressure to give 1.4 kg. of a pastry seasoning agent, which contained glutamic acid, sodium 5'-inosinate and various other amino acids and which had excellent enhancing properties. The undergoing Table 4 shows analytical results obtained from this seasoning agent.

TABLE 4

| | |
|---|---|
| Water _____percent__ | 12.5 |
| NaCl _____do____ | 15.2 |
| Amino acids (percent): | |
| Glutamic acid _____ | 8.0 |
| Aspartic acid _____ | 1.8 |
| Threonin _____ | 0.8 |
| Serine _____ | 0.8 |
| Proline _____ | 0.4 |
| Glycine _____ | 0.6 |
| Ananine _____ | 3.5 |
| Alanine _____ | 3.5 |
| Methionine _____ | 0.5 |
| Isoleucine _____ | 0.8 |
| Tyrosine _____ | 0.4 |
| Leucine _____ | 0.9 |
| Phenylalanine _____ | 0.8 |
| Lysine _____ | 1.1 |
| Arginine _____ | 0.9 |
| 5'-inosinic acid (percent) _____ | 2.0 |
| Vitamins ($\gamma$/g.): | |
| Riboflavin _____ | 20.5 |
| Thiamine _____ | 5.6 |
| Nicotinic acid _____ | 48.8 |
| Pantothenic acid _____ | 28.0 |
| Biotin _____ | 0.01 |
| Pyridoxine _____ | 2.0 |
| Inositol _____ | 410 |
| Folic acid _____ | 1.8 |
| pH of 2% aqueous solution _____ | 5.5 |

Example 3

A spent fermentation liquor (contents—1.2 g./dl. of glutamic acid, 0.58 g./dl. of alanine, 0.5 g./dl. of aspartic acid, 0.5 g./dl. of glutamine, 0.1 g./dl. of lysine, 0.15 g./dl. of valine, 0.13 g./dl. of leucine, 1.4 g./dl. of dried cells, proteins, peptides, vitamins, sugars, etc.) in an amount of 100 litres, which was obtained by the separation of substantial amounts of glutamic acid from the fermented broths of glutamic acid fermentation, was treated by addition of sodium carbonate to give a concentration of 0.03 N and was concentrated in vacuo at 50° C. to remove impurities such as ammonia. There was obtained 50 litres of the concentrated solution, which was heated at 55° C. for 2 hours, was adjusted to a pH of 7.2 by the addition of HCl and was heated at 105° C. for 10 minutes. After cooling, the solution was enzymatically decomposed by adding 9 grams of Pronase (the trade name of a protease preparation available from Kaken Kagaku Kogyo K.K., Japan), corresponding to 1% by weight of total protein substrates and heating at 50–55° C. for 16 hours with stirring. Due to the decomposition, cell proteins and free proteins were hydrolyzed to amino acids and peptides, and various other compositions such as vitamins contained in cell bodies were sufficiently eluted, thereby proteins were converted into amino acids and lower peptides with a yield of 82–85%. The removal of colouring matters and bitter taste from the decomposed solution was carried out in the following manner. The decomposed solution was adjusted to a pH of 4.8 by the addition of HCl and was filtered to separate filtrate from undecomposed residue. The latter was washed with 3 litres of water. 51 litres of combined transparent solutions were obtained by adding the washings to the filtrate. The solution was then passed at a flow rate of Space Velocity of 2 through a resin column packed with 2.5 litres of Duolite S–30 (decolouring resin) having a volume corresponding to 1/20 by volume of the solution to be treated. The elution was completed after 10 hours. The column was washed with 5 litres of water and the washings were combined with the eluting solution to give an amount of 55 litres in total. The eluate was treated with sodium carbonate and sodium hydroxide to adjust to a pH of 5.5 and was concentrated in vacuo at 50–55° C. to give 3.78 kg. of pastry seasoning agent, which had excellent enhancing and flavouring properties and the following compositions.

Compositions of the seasoning (by weight)

| | | |
|---|---|---|
| Water | percent | 12.5 |
| Total nitrogen | do | 10.5 |
| Alanine | do | 10.3 |
| Lysine | do | 2.0 |
| Leucine | do | 3.7 |
| NaCl | do | 12.8 |
| Glutamic acid | do | 30.1 |
| Aspartic acid | do | 10.1 |
| Valine | do | 4.0 |
| Thiamine | $\gamma/g$ | 4.3 |
| Pantothenic acid | $\gamma/g$ | 37.1 |
| Pyridoxine | $\gamma/g$ | 1.5 |
| Folic acid | $\gamma/g$ | 1.8 |
| Riboflavin | $\gamma/g$ | 16.4 |
| Nicotinic acid | $\gamma/g$ | 66.6 |
| Inositol | $\gamma/g$ | 375 |

Other various amino acids are also detected.

Example 4

A glutamic acid spent fermentation liquor in an amount of 100 litres from which substantial amount of glutamic acid was recovered and which contained 1.2 g./dl. of glutamic acid, 0.5 g./dl. of alanine, 0.5 g./dl. of aspartic acid, 0.3 g./dl. of glutamine, 0.1 g./dl. of lysine, 0.15 g./dl. of valine, 0.13 g./dl. of leucine, 1.4 g./dl. of microbial bodies (measured in dried state), peptides, proteins, vitamins, sugars, etc. was treated with sodium carbonate to a concentration of 0.03 N, and was concentrated in vacuo at 50° C. to obtain 50 litres of the concentrated solution. The solution was treated with hydrochloric acid to give a pH of 7.2 and was heated at 105 ° C. for 10 minutes. After cooling, the solution was mixed with 1.8 g. of Pronase (a trade name of the protease preparate available from Kaken Kagaku Kogyo K.K., Japan) and decomposed with stirring at 50–55° C. for 16 hours. The decomposed solution was adjusted to a pH of 4.5 with hydrochloric acid and was filtered to obtain 5 litres of filtrate and 2.5 kg. of undecomposed substance (water content—70.2%). The undecomposed substance was treated with 1.3 kg. of concentrated hydrochloric acid (35%) and was hydrolyzed by heating at 105° C. for 16 hours. There was obtained a hydrolyzed solution having an APL value of 2.1 and containing large amounts of lower peptides and amino acids.

The hydrolyzed solution was diluted with 2 litres of water and was filtered to obtain a filtrate and residual substance. The latter was washed with 2 litres of water. The washings and the filtrate were combined to give 7 litres of combined solutions, which were then concentrated under reduced pressure to an amount of 1.5 litres. The concentrated solution was combined with the decomposed solution obtained by the enzymatic treatment, the resulting solution was adjusted to a pH of 6.4 with caustic soda and then concentrated under reduced pressure at 45–50° C. to yield a seasoning in the paste form. It was observed that the product represented an excellent enhancing and flavouring agent containing various amino acids, peptides, organic acids, vitamins, etc. and being suitable for all seasoning purposes.

Example 5

A 5'-inosinic acid fermentation broth in an amount of 100 litres, obtained by culturing *Brevibacterium ammoniagenes* KY 3454 in conventional manner, was adjusted to a pH of 4.5 and gave 8.4 kg. of cell bodies (water content—70.2%) upon centrifugation, which were then mixed with 52 litres of 0.03 N caustic soda aqueous solution to form a cell milk. The cell milk was heated at 60° C. with stirring for one hour to dissolve cell walls and membranes, then mixed with 2 N HCl aqueous solution to adjust the pH to 7.0, and then heated at 105° C. for 10 minutes. After cooling to 45° C., the solution was mixed with 7.7 grams of Streptomyces protease, Prozyme (the trade name of a protease available from Kyowa Hakko Kogyo K.K., Tokyo, Japan), and the cell protein decomposed at 55–57° C. for 10 hours.

After the decomposition was discontinued, the decomposed solution was mixed with 2 N HCl aqueous solution to adjust a pH of 4.5 and was filtered to give 50 litres of the filtrate and 4 kg. of the undecomposed substance (water content: 70.2%). The filtrate was passed through a resin column packed with 1.7 litres of Duolite S–30 (decolouring resin) in its Cl form at a flow rate of Space Velocity of 2. The elution was discontinued after 15 hours. The column was washed with 3 litres of water, which was combined with the eluted solution to obtain 53 litres of combined eluting solution.

The undecomposed substance in an amount of 4 kg. was mixed with 1.65 kg. of concentrated HCl (35%) and was hydrolyzed at 100° C. for 13 hours. The obtained hydrolyzed solution had an APL value of 2.6 and contained large amounts of peptides besides amino acids. The hydrolyzed solution was diluted with 2 litres of water, cooled and filtered to give a filtrate and residuals. The latter was mixed with 2 litres of water and filtered to give 8 litres of filtrate, which was concentrated to an amount of 2 litres. The concentrated solution was mixed with 2 N caustic soda aqueous solution to adjust to a pH of 4.0, further diluted with water to give an amount in total of 5 litres, afterwards treated with 60 g. of active charcoal to remove colouring matter and bitterness. The solution was filtered to obtain 4.5 litres of a filtrate, which was combined with aforesaid eluate obtained by the treatment with the decolouring resin. The combined solution was adjusted to a pH of 6.2 with caustic soda, was concentrated in vacuo at 45–50° C. to yield 2.1 kg. of combined seasoning in the paste form. The combined seasonings obtained contained sodium 5'-inosinic acid and amino acids such as glutamic acid, peptides, vitamins, etc. and had meat-like flavour. Various tests including functional panel tests detected that the combined seasonings had excellent enhancing and flavouring properties.

The following table shows the analytical results obtained from the seasoning of this example.

Analysis of the seasoning

| | | |
|---|---|---|
| Water | percent | 13.7 |
| NaCl | do | 10.6 |
| Total N | do | 7.7 |
| 5'-inosinic acid | do | 6.1 |
| Thiamine | γ/g | 10 |
| Pantothenic acid | γ/g | 40 |
| Pyridoxine | γ/g | 3.0 |
| Folic acid | γ/g | 3.0 |
| Riboflavin | γ/g | 31 |
| Nicotinic acid | γ/g | 0.2 |
| Biotin | γ/g | 0.03 |
| Inositol | γ/g | 540 |

This seasoning can be used alone or, if desired, may be incorporated with the HCl-hydrolyzate of the insoluble fraction, which can be prepared by the process of the present invention.

Example 6

A fermentation broth in an amount of 100 litres, obtained by culturing *Micrococcus glutamicus* ATCC 13761 in conventional manner, was adjusted to a pH of 4.5 and was centrifuged to give 5.5 kg. of microbial bodies (water content—73.5%), which were mixed with 35 litres of 0.05 N aqueous solution of sodium carbonate to form a cell milk. The cell milk was heated at 55° C. for two hours, with stirring. After this, the solution was adjusted to a pH of 7.2 by adding 2 N aqueous solution of hydrochloric acid and was heated at 105° C. for 16 minutes. After cooling to 55° C., the solution was mixed with 7.5 grams of Pronase (the trade name of a protease preparate available from Kaken Kagaku Kogyo K.K., Tokyo, Japan), i.e. in an amount of 1% by total protein, and was hydrolyzed at 50–55° C. for 16 hours. The hydrolyzed solution contained 2.7 g./l. of total nitrogen and 2.2 g./l. of glutamic acid. In this solution, 82% of cell protein was decomposed to form amino acids and peptides. As the decomposed solution contained a bitter taste, the following procedures were carried out for the removal of bitter taste and colouring matters. The solution was adjusted to a pH of 4.8 by adding 2 N HCl aqueous solution and was filtered to obtain a filtrate and undecomposed part. The undecomposed part was washed with 2 litres of water. The filtrate and washings were combined to give 36.5 litres of clear combined decomposed solutions, which were then passed through a resin column packed with 1.8 litres of a decolourizing resin, Duolite #S-30, in its Cl form in a volume of 1/20 to that of the solution to be decomposed, at a flow rate of Space Velocity of 2.0. The elution was completed after about 10 hours. The resin was washed with water in an amount of 4 litres. The eluate and washings were combined to give 50 litres of combined solutions having no bitter taste. After adjusting the pH to 5.5 by the addition of 2 N caustic soda solution, the solution was concentrated under reduced pressure at 50–60° C. to give 780 grams of a pastry substance, which had excellent enhancing properties and the following compositions (Table 3):

TABLE 3.—ANALYTICAL RESULTS OF THE PASTRY SEASONING AGENT

| | | |
|---|---|---|
| Water | percent | 12.3 |
| Glutamic acid | do | 11.8 |
| NaCl | do | 11.5 |
| Nitrogen (total) | do | 12.3 |
| Thiamine | γ/g | 7.2 |
| Pantothenic acid | γ/g | 62 |
| Pyridoxine | γ/g | 3.2 |
| Folic acid | γ/g | 3.1 |
| Riboflavin | γ/g | 27.3 |
| Nicotinic acid | γ/g | 112 |
| Biotin | γ/g | 0.01 |
| Inositol | γ/g | 625 |

Example 7

The undecomposed part obtained from the enzymatic hydrolysis in a similar manner to that described in Example 1 in an amount of 5.0 kg. (water content—72.5%) was mixed with 2.0 kg. of concentrated HCl (35%). The concentration of HCl in the mixture was about 3.5 N. The hydrolysis was carried out at 110° C. for 14 hours to give a decomposed solution having about 2.0 of APL value, which showed that the solution included large amounts of lower peptides and amino acids. The decomposed solution was filtered after cooling to separate humous from filtrate. The filter cake was washed with 4 litres of water, and the wash was combined with the before-mentioned filtrate to give 8.5 litres of combined solutions, which was diluted with 1.5 litres of water to make up to 10 litres and which was then concentrated in vacuo to 5 litres.

The concentrate was treated with sodium carbonate and sodium hydroxide to adjust pH to 4.5, and was further diluted with water to make up to 10 litres. The solution was mixed with 100 g. of active carbon, and stirred for about 1 hour, to remove impurities such as colouring matters and bitterness. By filtration, 9.5 litres of filtrate was obtained and was made up to 10 litres with water.

10 litres of the filtrate so obtained was combined with 5 litres of the decomposed solution similar to that described in Example 3. The combined solutions were treated in a similar manner to that described in Example 1 and gave 2.2 kg. of combined seasonings in the paste form, which were detected by various tests including taste panel tests to be excellent enhancing and flavouring agents.

We claim:

1. A process for the preparation of seasonings from microbial bodies obtained from fermentation liquors wherein amino acids and nucleic acid-related substances are produced, or from spent fermentation liquors for the production of amino acids and nucleic acid-related substances containing such microbial bodies, comprising:
   (a) adding to the microbial bodies or to the fermentation liquor containing said microbial bodies an alkaline salt or alkali to give a concentration of about 0.02–0.1 N;
   (b) heating the solution at about 50–80° C. for about 1–3 hours;
   (c) adjusting the pH of the solution to about 6.0–8.0;
   (d) adding to the solution an enzyme capable of decomposing microbial proteins in an amount of about 0.5–2.0% by weight of total protein, to decompose microbial protein;
   (e) subjecting the solution to enzymatic decomposition at about 50–60° C. for about 6–48 hours;
   (f) removing bitter taste and colouring matters from the decomposed solution; and
   (g) separating the decomposed fraction from the undecomposed fraction whereby to obtain a seasoning from the decomposed fraction.

2. A process according to claim 1 in which the decomposed fraction is further decomposed by adding hydrochloric acid in such amount that the weight of hydrochloric acid, on the basis of 35% HCl, amounts to about 3–5 times that of the microbial total protein contained in the undecomposed fraction, acid decomposition is carried out at about 110–115° C. thereby to obtain a total nitrogen to amino nitrogen ratio of about 1.6–3.5, and the decomposed product is further added to the seasoning obtained by the process defined in claim 1.

3. The process of claim 1 wherein the said enzyme is protease or an enzyme solution containing protease.

4. The process of claim 1 wherein in step (a) there is added an alkaline salt selected from the group consisting of sodium carbonate and sodium bicarbonate.

5. The process of claim 1 wherein in step (a) there is added an alkali selected from the group consisting of sodium hydroxide and potassium hydroxide.

6. The process of claim 1 wherein the starting material is a fermentation broth from the fermentation process for production of amino acids or nucleic acid-related substances from which substantial amounts of the main product have been recovered.

7. The process of claim 6 wherein the fermentation broth is an amino acid fermentation broth resulting from a fermentation process for production of glutamic acid, lysine, valine, leucine, isoleucine, ornithine or threonine.

8. The process of claim 6 wherein the fermentation broth is a broth resulting from a fermentation process for the production of 5'-inosinic acid, 5'-guanylic acid, orotic acid or guanine.

9. The process of claim 1 wherein the solution resulting from step (c) is heated for about 3–10 minutes at about 80–130° C. before addition of the enzyme.

10. The process of claim 2 wherein the acid decomposition is carried out for about 10–20 hours.

References Cited

UNITED STATES PATENTS

| | | | |
|---|---|---|---|
| 1,854,930 | 4/1932 | Frey et al. | 99—97 |
| 2,921,002 | 1/1960 | Kita | 195—29 XR |
| 3,212,902 | 10/1965 | Bavisotto | 99—14 XR |

FOREIGN PATENTS 933,828  7/1960  Great Britain.

MAURICE W. GREENSTEIN, Primary Examiner

U.S. Cl. X.R.

99—14; 195—28, 29